United States Patent
Massey et al.

(10) Patent No.: US 12,533,619 B1
(45) Date of Patent: Jan. 27, 2026

(54) CABIN AIR FILTER REMOVAL AND INSTALLATION TOOL AND METHOD OF USING THE SAME

(71) Applicant: Groove Technologies, LLC, Houston, TX (US)

(72) Inventors: Fred Massey, Round Top, TX (US); Owen Massey, Round Top, TX (US)

( * ) Notice: Subject to any disclaimer, the term of this patent is extended or adjusted under 35 U.S.C. 154(b) by 0 days.

(21) Appl. No.: 19/210,462

(22) Filed: May 16, 2025

(51) Int. Cl.
| | | |
|---|---|---|
| B01D 46/42 | (2006.01) |
| B01D 46/00 | (2022.01) |
| B01D 46/48 | (2006.01) |
| B01D 46/52 | (2006.01) |
| B60H 3/06 | (2006.01) |

(52) U.S. Cl.
CPC ..... B01D 46/4227 (2013.01); B01D 46/0032 (2013.01); B01D 46/0047 (2013.01); B01D 46/48 (2013.01); B01D 46/521 (2013.01); B60H 3/0658 (2013.01); B01D 2279/40 (2013.01)

(58) Field of Classification Search
CPC ............ B01D 46/4227; B01D 46/0032; B01D 46/0047; B01D 46/48; B01D 46/521; B01D 2279/40; B60H 3/0658
See application file for complete search history.

(56) References Cited

U.S. PATENT DOCUMENTS

| | | | |
|---|---|---|---|
| 3,856,488 A * | 12/1974 | Kato | B01D 46/2411 55/497 |
| 5,192,346 A | 3/1993 | Kowalczyk | |
| 5,993,519 A * | 11/1999 | Lim | B01D 46/88 95/286 |
| 6,019,676 A | 2/2000 | Kim | |
| 7,083,514 B1 * | 8/2006 | Stamey, Jr. | B60H 3/0608 62/61 |
| 7,797,791 B2 * | 9/2010 | White | A47L 9/122 15/352 |
| 8,075,658 B2 | 12/2011 | Volkmer et al. | |
| 8,940,069 B2 | 1/2015 | Haider | |
| 9,687,769 B2 | 6/2017 | Mardall et al. | |
| 9,964,078 B2 | 5/2018 | Pham et al. | |
| 10,328,377 B2 | 6/2019 | Ferreira | |
| 11,945,286 B1 | 4/2024 | Massey et al. | |
| 2003/0167590 A1 * | 9/2003 | Oh | A47L 9/1666 15/353 |
| 2012/0204523 A1 * | 8/2012 | Woolard | B01D 46/10 55/357 |

(Continued)

*Primary Examiner* — Jennifer Dieterle
*Assistant Examiner* — Phillip Y Shao
(74) *Attorney, Agent, or Firm* — Egbert, McDaniel & Swartz, PLLC (57) ABSTRACT

An assembly for preventing debris or dust from entering a motor used to pass cabin air in a vehicle has a housing having a first conduit opening to a surface of the housing and a second conduit opening to another surface of the housing, an air filter received within the interior of the housing and positioned between the first and second conduits, and a body removably received in the interior of the housing. The body is interposed between the air filter and the surface of the housing and overlies an opening of the first conduit so as to block debris or dust from entering the motor. The air filter is adapted to filter air from the second conduit as the air is drawn through the air filter by the motor. A handle is integrated with or affixed to the body so as to extend outwardly of the housing.

15 Claims, 5 Drawing Sheets

(56) References Cited

U.S. PATENT DOCUMENTS

| | | | |
|---|---|---|---|
| 2014/0150658 A1* | 6/2014 | Prax | B01D 46/0002 |
| | | | 96/74 |
| 2016/0280046 A1 | 9/2016 | Williams et al. | |
| 2016/0282000 A1* | 9/2016 | Noh | F24F 8/192 |
| 2016/0296870 A1* | 10/2016 | Mckechnie, IV | B01D 46/10 |
| 2017/0001135 A1 | 1/2017 | Paramore | |
| 2017/0368490 A1 | 12/2017 | Wall | |
| 2022/0040621 A1* | 2/2022 | Dicicco | B01D 46/10 |

* cited by examiner

CABIN AIR FILTER REMOVAL AND INSTALLATION TOOL AND METHOD OF USING THE SAME

CROSS-REFERENCE TO RELATED APPLICATIONS

Not applicable.

FIELD OF THE INVENTION

The present invention relates to cabin air filter for use in the heating and ventilation system of a vehicle. More particularly, the present invention relates to tools for the installation or removal of such air filters from the air filter housing. Additionally, the present invention relates to techniques for removing and installing air filters into the air filter housing that prevent dust and debris from the air filter from falling into the air filter motor.

BACKGROUND OF THE INVENTION

In view of increasing air pollution, in particular in metropolitan areas, in connection with the use of modern air conditioning devices for vehicles, it is necessary and desirable to purify the air that is supplied from the exterior to the interior of the motor vehicle. This purification of the air is carried out by suitable air filters. For example, particle filters or odor-eliminating filters or their combinations are suitable for this purpose. The filter should remove and absorb as much as possible of suspended solids, particles and odors contained in the ambient air. Such filters or filtering air for the interior of a motor vehicle are generally known in a plurality of embodiments in variance.

Figure 1:
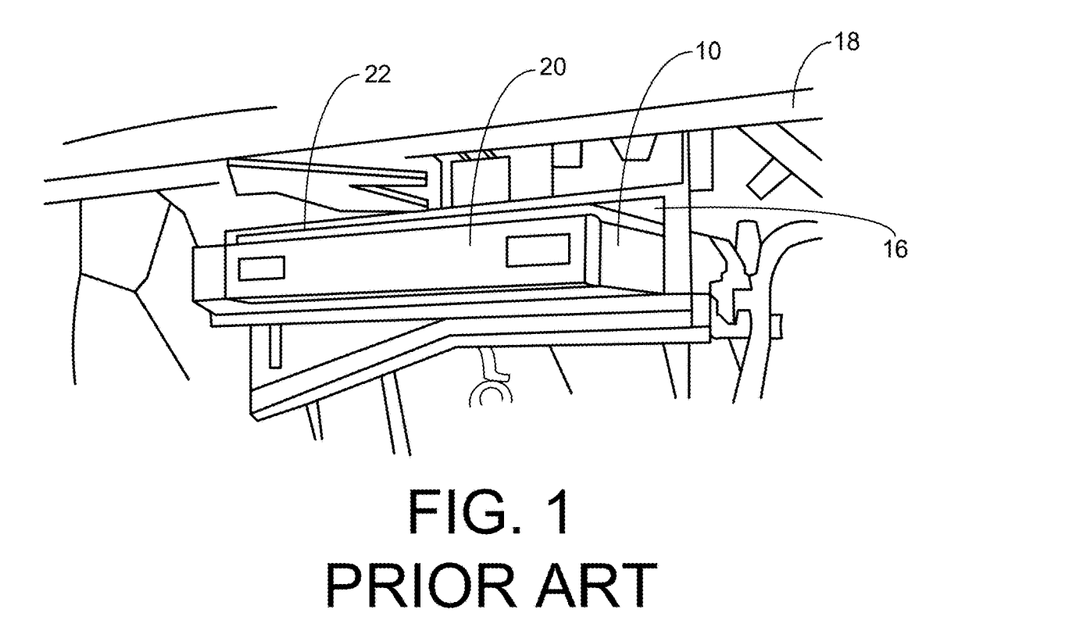
FIG. 1 is at lower perspective view showing a cabin air filtering system of the prior art.

FIG. 1 shows the air filter 10 as received within a air filter housing 16 of a vehicle 18. Typically, there is a small door at the forward face 20 of the filter 10 that locks the filter 10 in place within the filter-receiving receptacle 16. At this point in time, the filter 10 is in a proper position for filtering air passing through the air-conditioning system of the vehicle. After a certain amount of time, the door to the air-conditioning housing 16 is opened in the direction of arrow 22 and the filter slides outwardly of the filter-receiving receptacle for removal and/or cleaning.

Figure 2:
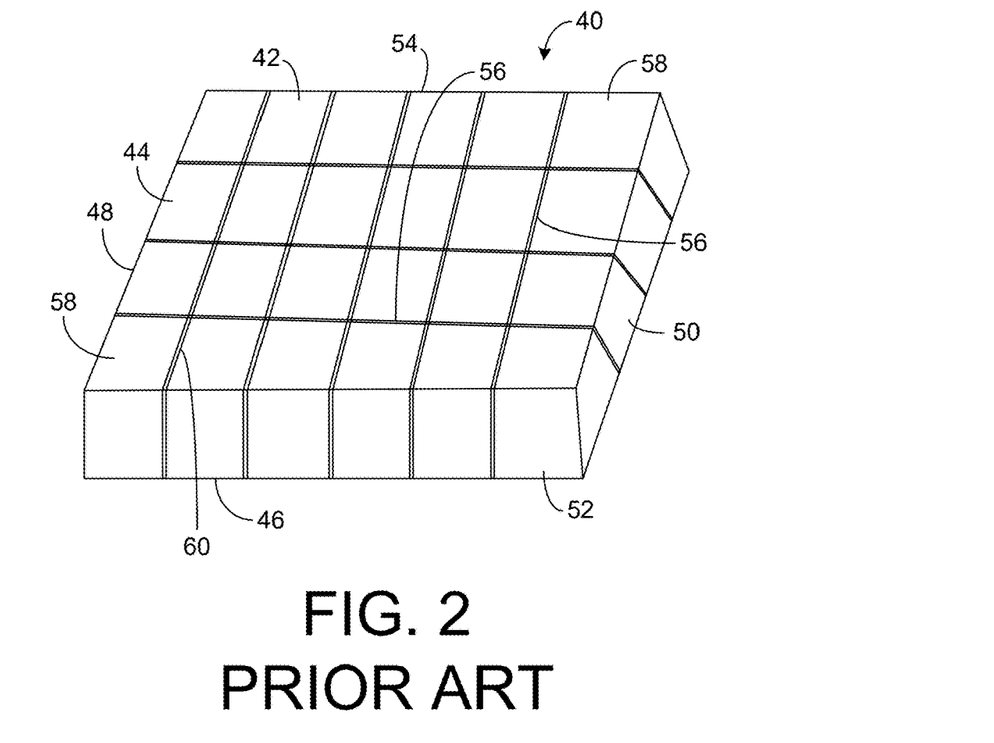
FIG. 2 is an upper perspective view showing an air filter of the prior art.

FIG. 2 shows an air filter 40 that can be used with in the air filter housing 16. The filter 40 can have a wide variety of shapes and sizes. In particular, the air filter 40 includes a body 42 being formed of an air-transmissive material. This air-transmissive material is an open-cell foam material. This open-cell phone material can be a polyurethane, a foamed polyether or foamed polyester (reticulated and non-reticulated). The body has a generally rectangular configuration. In particular, the body has a top 44, a bottom 46, a pair of sides 48 and 50, a front 52 and a back 54. The body has a plurality of cuts 56 three thickness thereof. The thickness is defined between the top 40 for the bottom 46. The plurality of cuts 56 define a plurality of cubicle members 58 that are frangibly connected together.

The plurality of cubicle members 58 are frangibly connected to each other by a segment or piece of the air-transmissive foam material 60. As such, the body 42 is held together in its generally rectangular configuration by the segments or pieces of the air-transmissive material.

The top 44 is in parallel planar relationship to the bottom 46. The pair of sides 48 and 50 are in parallel planar relationship to each other. The front 52 is in parallel planar relationship to the back. 54.

The subject matter of FIG. 2 is part of the prior art described in U.S. Pat. No. 11,945,286 issued on Apr. 2, 2024 to the present Applicant. Each of the plurality of cubicle members 58 are separable by hand from a remainder of the body 42. Each of the plurality of cubicle members 58, has sides of a of approximately a one-inch square area. For the purposes of fitting into the air-conditioning filter housing of the vehicle, these one-inch sides of the cubicle members will allow a user to easily determine the proper size of the filter 42 insert within the filter-receiving receptacle of the vehicle. For example, if the size of the OEM filter is 7"×9", each of the cubicle members 58 can be removed until it achieves the proper size. As such, the body 42 can be properly shaped by removing the cubicle members 58 until the desired size is reached. Since the body 42 is a very large size, many vehicle filters can be formed for a single body 42. In terms of inventory, the use of the relatively large bodies 42 will allow the bodies to be stacked one upon another within a storage area. When a certain size of air filter is required, a person can take the body 42 and remove the cubicle members 48 until the desired size is achieved. The remaining portion of the body 42 can be placed back into storage for future shaping. Since the body 42 has no frame around the periphery thereof, the shaping by the separation of the cubicle members 58 from adjacent cubicle members, can be carried out in a quick and easy fashion.

Figure 3:
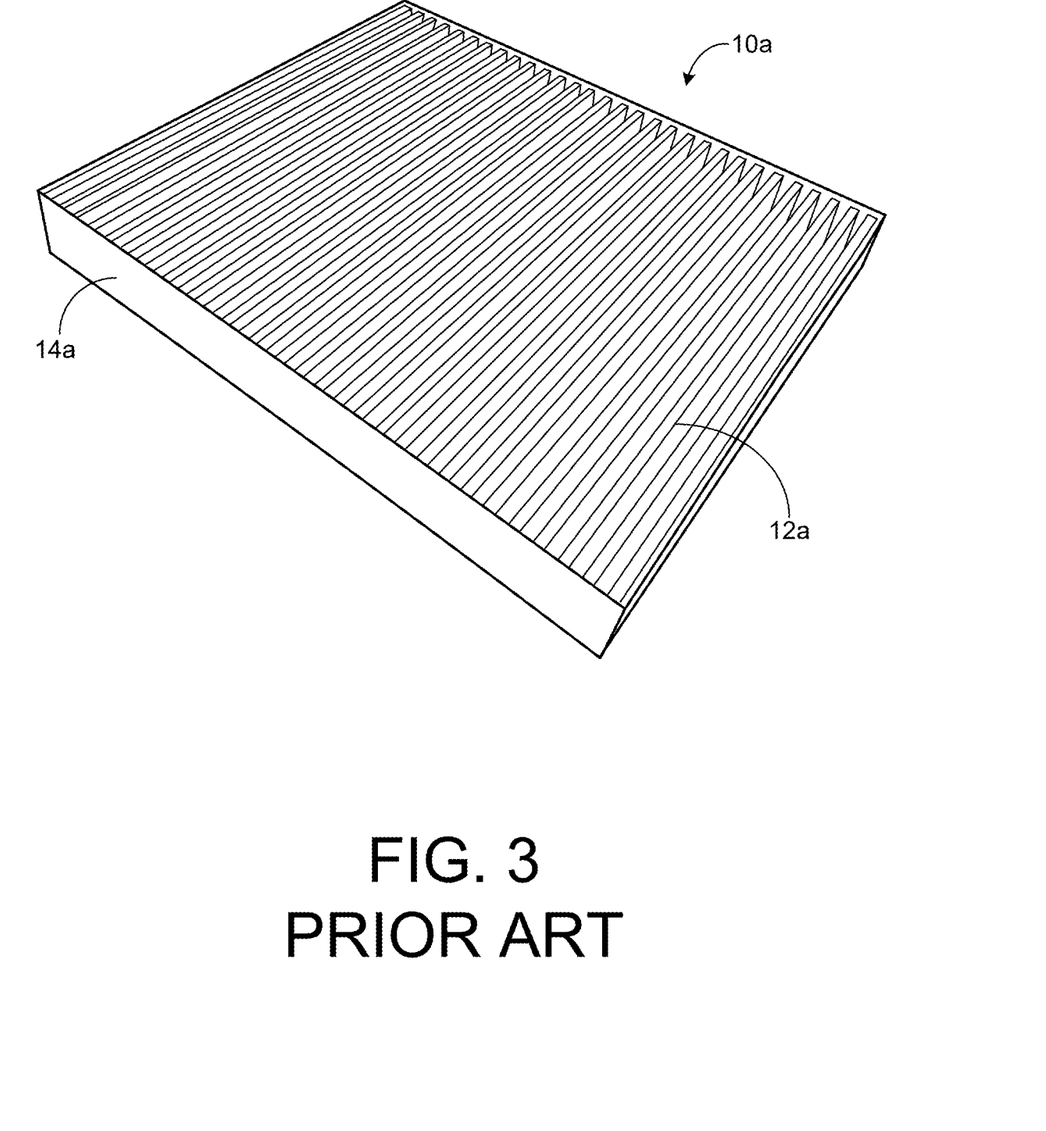
FIG. 3 is an upper perspective view of a conventional pleated filter of the prior art.

FIG. 3 shows a typical cabin air filter 10a of the prior art. This typical cabin air filter 10a is formed of a paper material 12a that is folded into pleats and received within a frame 14a. The size of the pleats and the distance between adjacent pleats are configured so as to maximize the filtering ability and airflow characteristics of the air filter 10a. The frame 14a will have a particular size to fit the filter-receiving receptacle of the vehicle (as shown in FIG. 1).

A common problem associated with such air filters and those of the prior art is that as the air filter is removed from the air filter housing, the dust and debris that is accumulated on the surfaces of the air filter can become dislodged during this removal. When this dirt and debris becomes dislodged, it will naturally flow toward the conduit leading to the air filter motor. Your filter motor is intended to draw air through a conduit and through the air filter and, ultimately, to the passenger compartment of the vehicle. As more and more dirt and debris is accumulated within the air filter motor, this can reduce the efficiency and operating characteristics of the motor. As such, a need has developed so as to avoid any release of dirt, debris and dust from the air filter during the removal and installation of the air filter.

In the past, various patents and patent application publications have issued with respect to such air-conditioning filters and the removal and installation of such air filters.

U.S. Pat. No. 5,192,346, issued on Mar. 9, 1993 to T. Kowalczyk. This patent teaches an air purifier pleated filter that stops pollution for the passenger inside the motor vehicle. This pleated filter is installed in the plenum of the cowl plenum chamber of the vehicle's heating-cooling system. The filter is equipped with a sensor switch that notifies the driver whenever the filter becomes dirty and must be replaced. The filter includes a hot fluid heater, such as a hot water heater, which protects the filter from freezing and keeps the filter dry which stops bacteria from multiplying and prevents odors.

U.S. Pat. No. 6,019,676, issued on Feb. 1, 2000 to S. Kim, provides an air filtration method and device to more effectively clean the ambient air being fed into a motor vehicle's passenger compartment via the existing OEM ventilation and heating/air conditioning system. The air is treated instantly as it is being discharged into the passenger compartment and the filter is compatible with existing OEM air filtration processes that are provided at the cowl inlet or located mid-stream within the ducting system.

U.S. Pat. No. 7,083,514, published on Aug. 1, 2006 to Stamey, Jr. et al., provides an air-filtration system provided for use in a vehicle for delivering air to a helmet worn by vehicle operator. The air-filtration system comprises an air intake in the form of a window scoop for drawing exterior air, an air duct assembly for delivering air from the air intake to the helmet, and an air filter assembly disposed in-line with the air duct assembly between the air intake and the helmet. The air filter assembly includes a catalyst member for converting carbon monoxide to carbon dioxide and a particulate filter member.

U.S. Pat. No. 8,075,658, issued on Dec. 13, 2011 to Volkmer et al., provides a filter element that has a zigzag-shaped fold pack of folds. At least one terminal element is folded parallel to the folds of the fold pack. The terminal element has a first leg, a second leg, and a third leg. The first leg is arranged substantially perpendicular to a flow direction of a medium flowing through the filter element. The first, second and third legs are determined by folds in the terminal element. The first and second legs are positioned substantially at right angles relative to one another. The third leg projects laterally away from the filter element to form a peripheral seal.

U.S. Pat. No. 8,940,069, issued on Jan. 27, 2015 to D. Haider, shows an interior air filter for motor vehicle that has a fold pack having a first side. A material with a first leg and a second leg is disposed on the first side. The first leg is attached to the first side and the second leg has a width that is greater than a height of the fold pack. The material strip forms at least partially a head band or a side band of the fold pack. A filter receptacle for the interior air filter has a slanted wall and a mounting and removal opening through which the interior air filter is inserted or removed. The slanted wall extends at an angle that corresponds to an angle defined by the second leg of the material strip of the interior air filter and a contact surface of the filter receptacle.

U.S. Pat. No. 9,687,769, issued on Jun. 27, 2017 to Mardall et al., provides an air filtration system for a passenger compartment of a vehicle that includes a HEPA filter for filtering air from an air inlet into filtered air. The HEPA filter includes a fine particulate filter and a gas filter. Air passageways are formed in the vehicle and configured to convey air from the air inlet to the HEPA filter and to convey the filtered air from the HEPA filter to the passenger compartment.

U.S. Pat. No. 9,964,078, issued on May 8, 2018 to Pham et al., teaches a filter assembly for a motor vehicle air cleaner that includes a main filter, an auxiliary filter set apart from the main filter, and a filter mount fixed to and supporting the main filter and the auxiliary filter. The filter mount is fillable into and removable from the housing of the air cleaner. The filter mount includes a sealing element passing between the main filter and the auxiliary filter.

U.S. Pat. No. 10,328,377, issued on Jun. 25, 2019 to I. Ferreira, shows a filter having a relatively rigid support frame having top and bottom frame members and side frame members. A filter element is disposed within and supported by the frame for filtering a medium passing through the filter element. A pair of opposing members of the frame are bendable into an arch so as to allow the filter to be progressively inserted along an arched path into a filter housing. The filter is a cabin air filter for a vehicle. Opposing sides of the frame are provided with V-shaped notches to facilitate bending the filter into an arch for insertion.

U.S. Patent Application Publication No. 2016/0280046, published on Sep. 29, 2016 to Williams et al., shows a cabin air filter that comprises a supportive frame configured to suitably orient the cabin air filter within an air filtration system of a vehicle. The supportive frame comprises a shape and size suitable for supporting the cabin air filter within the ventilation system. A filter medium is retained within the supportive frame and is configured to remove the airborne molecular contaminants and volatile organic compounds from air flowing through the ventilation system. The filter medium electrostatically attracts and agglomerates contaminants within the air flowing through the air filter.

U.S. Patent Application Publication No. 2017/0001135, published on Jan. 5, 2017 to R. Paramore, describes a cabin air filter that is constructed from a washable and reusable material. This cabin air filter is capable of being positioned within the air-conditioning and heating system of the vehicle and is capable of being washed while substantially maintaining its original shape.

U.S. Patent Application Publication No. 2017/0368490, published on Dec. 28, 2017 to J. J. Wall, teaches a compound air filter provided for sequestering airborne contaminants from air streamed through the air filter. The air filter includes a support frame having a shape and size suitable for setting the air filter within the air filtering system. The compound air filter is retained within the support frame. A first media layer of the compound filter medium is pleated with pleats and configured to exhibit a relatively high filtration efficiency at a low air pressure drop across the filter medium. A second media layer of the filter medium is coupled to the first media layer and configured to maintain a uniform distribution of the pleats within the first media layer.

It is an object of the present invention to provide a cabin air filter removal and installation tool that facilitates the ability to remove an air filter from air filter housing of a vehicle.

It is another object of the present invention to provide the cabin air filter installation and removal tool that prevents dust and debris from the air filter from falling into the air filter motor.

It is another object of the present invention to provide a cabin air filter installation and removal tool that serve to maintain the proper operation of the air filter system of a vehicle over an extended period of time.

It is another object of the present invention to provide a method of installing a cabin air filter that is easy to use and relatively inexpensive.

These and other objects and advantages of the present invention will become apparent from a reading of the attached specification and appended claims.

SUMMARY OF THE INVENTION

The present invention is at summary of the invention part of present invention is an article for removing and installing a cabin air filter from an air filter housing. The article includes a body having a planar shape and a handle integrated with or affixed to the body. The body as a length, a width and a thickness adapted to be slid into the air filter housing below the air filter. The handle is integrated with or affixed to one end of the body. The handle is adapted to still to extend outwardly of the filter housing when the body underlies the air filter. The handle has a size and shape adapted to be grasped by human hand.

The body and the handle are integrally formed together in a one-piece construction. In the preferred embodiment of the present invention, the body and the handle are formed of a nonporous polypropylene material. In the preferred embodiment, the thickness of the body is approximately one-sixteenth of an inch. Each of the body and the handle has a top surface and a bottom surface that are of a planar configuration.

The present invention is also an assembly for preventing debris or dust from entering a motor heat that is used to pass cabin air in a vehicle. This assembly includes a housing having an interior with a first conduit opening to a surface of the housing and a second conduit opening to another surface of the housing, and air filter received in the interior of the housing and positioned between the first and second conduits, and a body removably received in the interior of the housing so as to be interposed between the air filter and the surface of the housing so as to overlie the opening of the first conduit in order to block the debris or dust from entering the motor. The first conduit is adapted to communicate with the motor. The second conduit is adapted to deliver air into the interior of the housing. The air filters adapted to filter air from the second conduit as the air is drawn through the air filter by the motor.

A handle can be integrated with or affixed to the body. This handle extends outwardly of the housing. The handle has a size and shape adapted to be grasped by human hand. The body and the handle are integrally formed together in a one-piece construction in the preferred embodiment of the present invention. The body and the handle are formed of a nonporous polypropylene material and have a thickness of approximately one-sixteenth of an inch. Each of the body and the handle has a top surface of the bottom surface that are of a planar configuration.

The present invention is also a method of installing and removing an air filter from an air filter housing. The air filter housing has a first opening to a first conduit leading to a motor and a second opening to a second conduit that passes air into the air filter housing. The method includes the steps of: (1) inserting a planar body into the air filter housing so as to be interposed between the air filter and the first opening such that the air filter resides on the planar body; (2) sliding the planar body and the air filter outwardly of the air filter housing; (3) separating the air filter from the planar body after the step of sliding the planar body and the air filter outwardly of the air filter housing; (4) removing dust or debris from the separated air filter; and (5) installing the air filter or a new air filter back into the air filter housing.

In this method of the present invention, the step of installing includes inserting the planar body into the air filter housing such that the planar body resides against a surface of the air filter housing. The dust or debris-removed air filter or a new filter is installed onto a surface of the planar body within the air filter housing. The planar body is then removed from the air filter housing.

The planar body is formed so as to have a handle at one end thereof. The step of inserting the planar body includes grasping the handle of the planar body, moving the planar body toward the air filter housing, and inserting the planar body into the air filter housing such that the handle extends outwardly of the filter housing. The step of sliding includes grasping at least a portion of the handle extending outwardly of the housing, and pulling on the handle so as to slide the planar body and the air filter outwardly of the housing. An electrostatic charge can be applied to the planar body. The planar body is formed of a polypropylene material and has a thickness of approximately one-sixteenth of an inch in accordance with a preferred embodiment of the present invention.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 4:
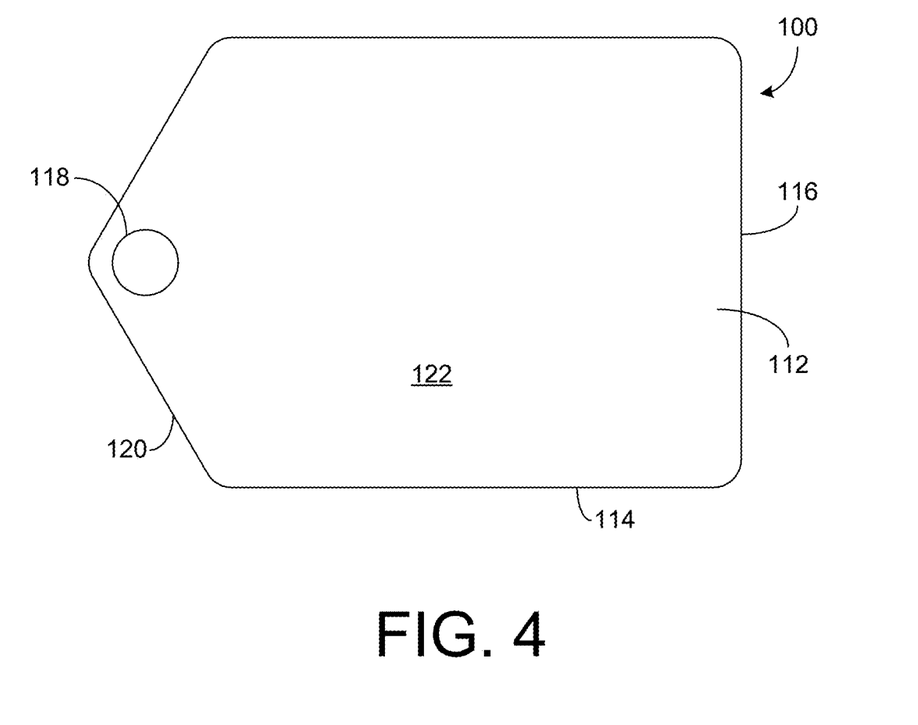
FIG. 4 is a plan view of the cabin air filter removal and installation tool of the present invention.

Referring to FIG. 4, there is shown the cabin air filter removal and installation tool 100 in accordance with the present invention. The cabin air filter removal and installation tool 100 includes a body 112 having a generally rectangular configuration. In particular, the body 112 has a planar shape. The body has a length dimension 114 and a width dimension 116 that are adapted to be slid into an air filter housing in a location below the air filter. A handle 118 is integrated with or affixed to the body 112 at one end 120 of the body 112. The handle 118 is adapted to extend outwardly of the filter housing when the body 112 underlies the air filter. The handle 118 has a size adapted to be grasped by human hand. As shown in FIG. 3, handle 118 is in the nature of a hole formed through a thickness of the body 112 at the end 120 of the body 112.

A wide variety of other configuration configurations of handle 118 can be envisioned and utilized in the concept of the present invention. The handle 118 can be integrated with the body 112 or a separate piece that is simply molded with the body 112 and extending outwardly therefrom. In the preferred embodiment of the present invention, the body 112 and the handle 118 are integrally formed of a one-piece construction. In particular, these can be formed of a nonporous polypropylene material. The thickness of the body 112 will be approximately one-sixteenth of an inch. FIG. 4 shows the top surface 122 of the body 112 as being of a planar configuration.

FIG. 4 shows the cabin air filter removal and installation tool 100 as positioned for being received with an air filter housing assembly 124 of a vehicle. In particular, in FIG. 5, it can be seen that the cabin air filter removal and installation tool has body 112 with a planar top surface 122 and a planar bottom surface 126. The thickness of the body 112 is approximately one-sixteenth of an inch. The handle 118 is formed at one end of the body 112. This allows the body 112 to easily slide into the housing 128.

Figure 5:
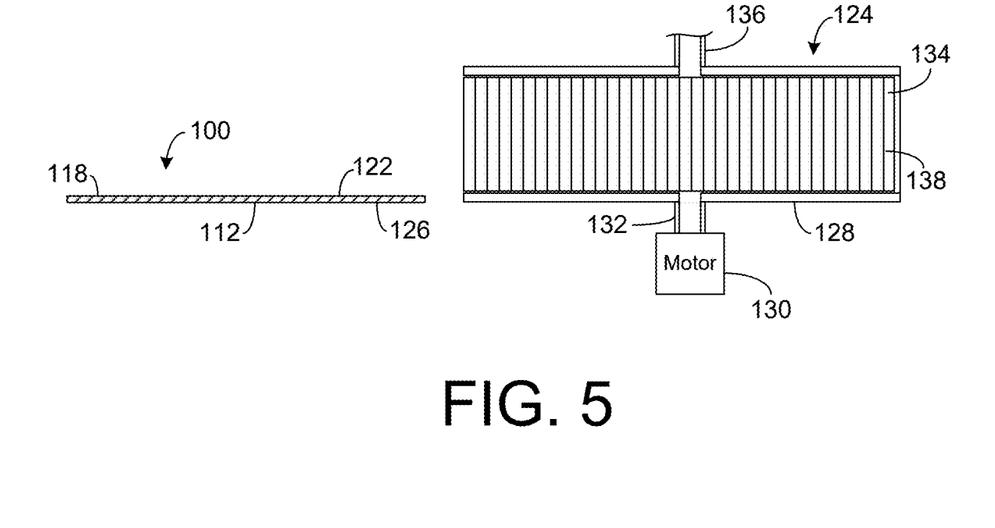
FIG. 5 is a cross-sectional side view showing an initial step during the removal of the air filter in accordance with the present invention.

FIG. 5 further shows that the filter housing assembly 124 includes a motor 130 that has a first conduit 132 opening to the interior 134 of housing 128. Motor 130 communicates with the interior 134 of the housing 128 so as to draw air into and through the second conduit 136 and ultimately into and through the interior 134 and, in particular through the filter 138. Second conduit 136 opens to the interior 134 of the housing 128. The filter 138 has a configuration shown in FIGS. 2 and 3 hereinabove, and described in association with the prior art.

Figure 6:
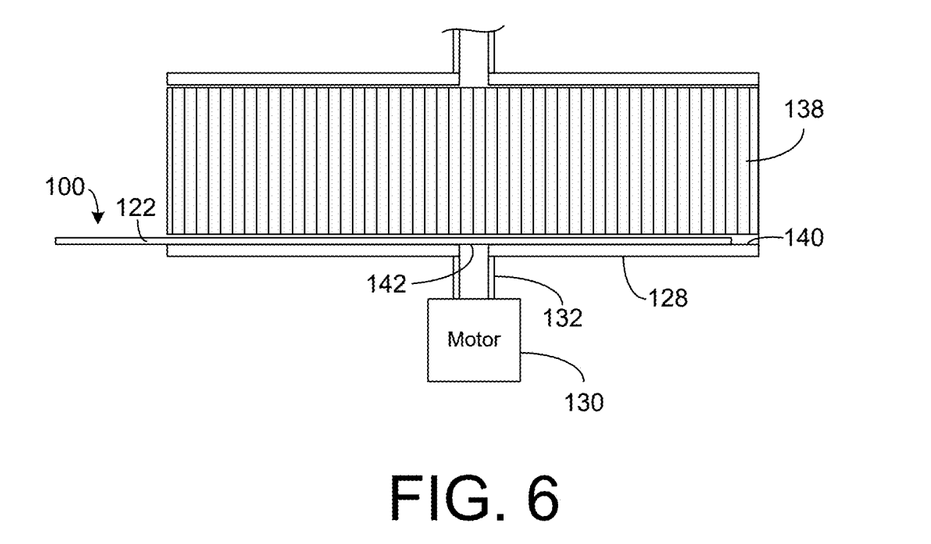
FIG. 6 shows a subsequent step for the removal of the air filter in accordance with the present invention.

FIG. 6 shows the initial step for the removal of the air filter 38 from the housing 28. The cabin air filter removal and installation tool 100. FIG. 6 shows that the cabin air filter removal and installation tool 100 has been slid below the air filter 138 and over the surface 140 of the housing 128. As such, the cabin air filter removal and installation tool 100 will cover the opening 142 from the conduit 132 of motor 130. As such, the cabin air filter removal and installation tool 100 effectively blocks any debris or dust from the air filter 138 from entering the conduit 132.

The air filter 138 can then be removed by sliding the cabin air filter removal and installation tool outwardly from the housing 128. During this removal process the dust and debris from the filter 138 will drop onto the top surface 122 of the cabin air filter removal and installation tool 100. As the cabin insulation removal tool 100 is slid outwardly of the housing 128 (along with the air filter 138), the opening 142 to the conduit 132 of motor 130 is continually blocked. As such, dirt, debris and dust will not enter the conduit 132 and will not affect the motor 130.

Ultimately, after the filter 138 has been removed from the housing 128, the filter can be discarded or cleaned so as to separate the dust and debris from the surface of the air filter 138. Similarly, any dust or debris that is accumulated on the top surface 122 of the cabin air filter removal and installation tool 100 can be brushed off the top surface 122 in an area away from the housing 128.

Figure 7:
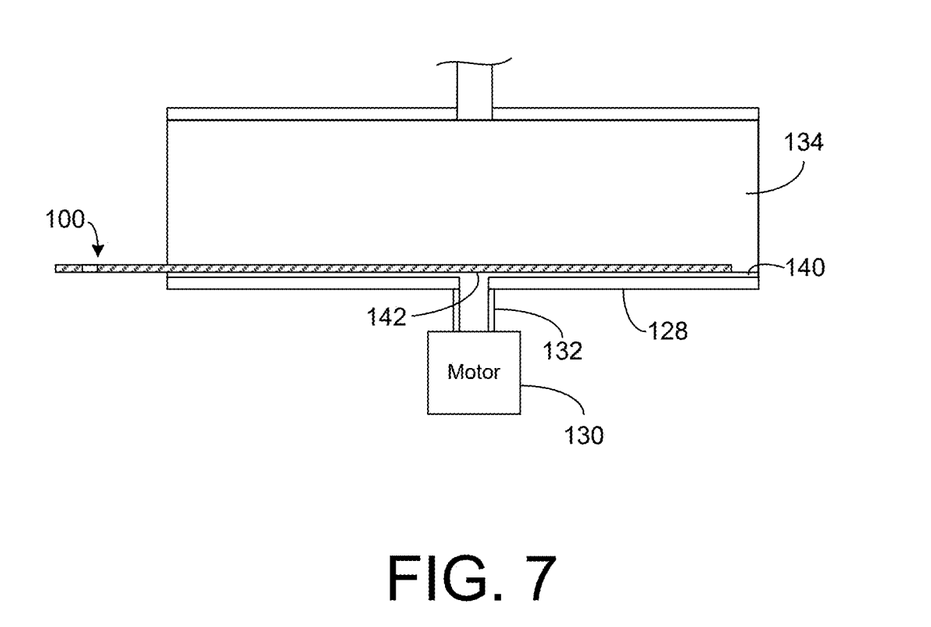
FIG. 7 shows a further step associated with the removal of the air filter of the present invention prior to the installation of the previous cleaned air filter or the installation of a new air filter.

FIG. 7 shows an initial step for the insertion of a new filter into the air filter housing 128. Initially, the cabin air filter removal and installation tool 100 is reintroduced into the interior 134 of the housing 128. The cabin air filter removal and installation tool can slide along the surface 140 at the bottom of the housing 128. As such, the cabin air filter removal and installation tool 100 will cover the opening 142 of the conduit 132 of motor 130.

The air filter can then be reintroduced into the interior 134 of the housing 128 by sliding along the top surface 122 of the cabin air filter removal and installation tool 100. Alternatively, the new air filter or cleaned air filter can be placed upon the top surface 122 prior to the insertion of the cabin air filter removal and installation tool into the interior, 134 of the housing 128. At all times, any residual dirt and debris on the cleaned air filter is prevented from entering the opening 142 of conduit 132. Ultimately, the motor 130 will never receive any dust or debris therein. This will greatly improve the efficiency of the motor 130 over time and prevent any potential damage to the motor that would prevent the proper operation of the vehicle air conditioning system.

Figure 8:
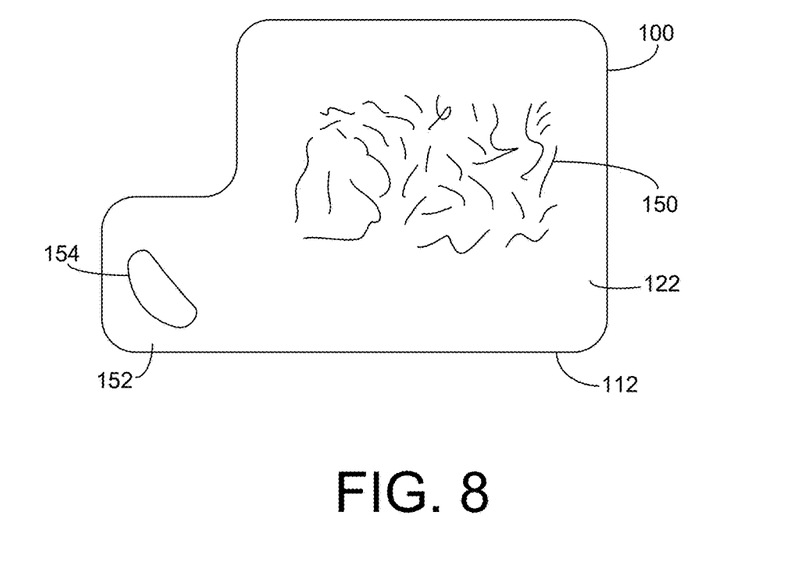
FIG. 8 is a plan view showing the cabin air filter removal and installation tool and showing, in particular, the dust and debris accumulated on the surface of the cabin air filter removal and installation tool.

FIG. 8 shows the cabin air filter removal and installation tool 100 after its removal from the housing 128. As can be seen, there is dirt, dust and debris 150 scattered over the top surface 122 of the body 112. FIG. 8 shows an alternative location for the handle 152. Handle 152 extends outwardly of a corner of the body 112 and includes a hole 154 formed therein. Hole 154 is adapted to be grasped by human hand. During use, this extension portion 152 would extend outwardly of the housing. The dust, dirt and debris 150 can be easily removed from the surface 122 with a brush. In an embodiment of the present invention, an electrostatic charge could be applied to the body 112 so as to be attractive of dust and dirt thereon. After the cabin air filter removal and installation tool 100 is removed from the housing 128, the simple cleaning can be carried out with a wipe, a brush, a shaking of the body 112, or other means. This can be carried out while the user is gripping the cabin air filter removal and installation tool 100 by the handle 152.

Figure 9:
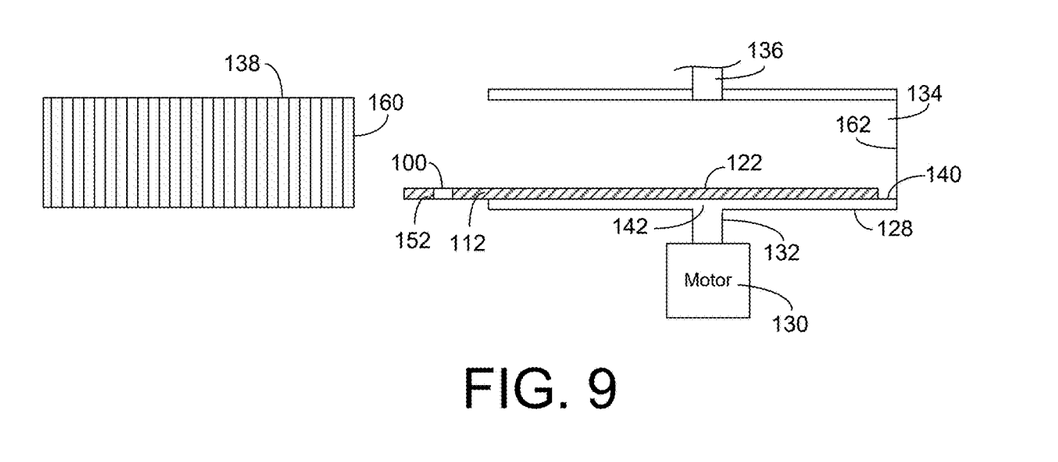
FIG. 9 is a cross-sectional view showing the further step of reinstalling the air filter or a new air filter into the air filter housing.

FIG. 9 shows the further step of introducing the air filter 138 back into the interior 134 of the housing 128. The cabin air filter removal and installation tool 100 is placed over the surface 140 (in the manner shown in FIG. 6). The air filter 138 can be suitably squeezed or pushed along the top surface 122 of the body 112 of the cabin air filter removal and installation tool 100. This pushing along the top surface 122 can continue until an end 160 of the air filter 138 abuts the end wall 162 of the housing 128.

After the filter 138 is installed, the user can grasp the handle 152, pull on the handle 152 so as to remove the cabin air filter removal and installation tool 100 from its position underlying the air filter 138. As such, the opening 142 of conduit 132 is exposed so that the motor 130 can draw air through the interior 134 of the housing 128, through the filter 138, and through the second conduit 136. The air filter 138 can then remain in place until it is time for replacement, cleaning or repair. As such, the steps of the method are carried out in the manner described herein previously.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

The invention claimed is:

1. An assembly for preventing debris or dust from entering a motor used to pass cabin air in a vehicle, the assembly comprising:

a housing having an interior, said housing having a first conduit opening to a horizontal surface of said housing, the conduit adapted to communicate with the motor, said housing having a second conduit opening to another horizontal surface of said housing, the second conduit adapted to deliver air into the interior of said housing;

an air filter received in the interior of said housing and positioned between the first and second conduits, said air filter adapted to filter air from said second conduit as the air is drawn through said air filter by the motor; and a flat body removably received in the interior of said housing, said flat body interposed between said air filter and the horizontal surface of said housing and overlying the opening of the first conduit so as to block the debris or dust from entering the motor, said flat body being formed of a nonporous material without openings formed therein.

2. The assembly of claim 1, further comprising:
a handle integrated with or affixed to said flat body, said handle extending outwardly of said housing, said handle having a size and shape adapted to be grasped by a human hand.

3. The assembly of claim 2, wherein said flat body and said handle are integrally formed together in a one-piece construction.

4. The assembly of claim 3, wherein said flat body and said handle are formed of a nonporous polypropylene material.

5. The assembly of claim 1, wherein a thickness of said flat body is approximately one-sixteenth inch.

6. The assembly of claim 1, wherein each of said flat body and said handle has a top surface and a bottom surface, each of the top surface and the bottom surface being planar.

7. The assembly of claim 1, wherein said air filter is formed of an air-transmissive open-cell polymeric material, said air filter being of a generally rectangular configuration, said air filter having a top and a bottom and a front and a back and a pair of sides, said air filter having a plurality of cuts extending entirely through a thickness thereof from the top to the bottom, the plurality of cuts defining a plurality of cubical members frangible connected together such that each of the plurality of cubical members is separable by hand from the remainder of said air filter such that an individual cubical member of the plurality of cubical members is removable along both of a portion of a length and a portion of a width of said air filter.

8. The assembly of claim 7, wherein the plurality of cubical members are connected together by a segment of the non-transmissive open-cell polymeric material.

9. A method of installing and removing an air filter from an air filter housing, the air filter housing having a first opening to a first conduit leading to a motor and a second opening to a second conduit that passes air into the air filter housing, the method comprising:
inserting a flat planar body horizontally into the air filter housing so as to be interposed between the air filter and the first opening so that the air filter resides on the flat planar body, the flat planar body being non-porous with no openings therein;
sliding the flat planar body and the air filter horizontally outwardly of the air filter housing;
separating the air filter from the flat planar body after the step of sliding the flat planar body and the air filter outwardly of the air filter housing;
removing dust or debris from the separated air filter; and
installing the air filter or a new air filter back into the air filter housing.

10. The method of claim 9, wherein the step of installing comprises:
inserting the flat planar body into the air filter housing such that the flat planar body resides against a horizontal surface of the air filter housing;
installing the air filter or the new air filter onto a surface of the flat planar body within the air filter housing; and
removing the flat planar body from the air filter in the air filter housing.

11. The method of claim 9, further comprising:
forming the flat planar body so as to have a handle at one end thereof.

12. The method of claim 11, wherein the step of inserting the flat planar body comprises:
grasping the handle of the flat planar body;
moving the flat planar body toward the air filter housing; and
inserting the flat planar body into the air filter housing such that the handle extends horizontally outwardly of the air filter housing.

13. The method of claim 12, wherein the step of sliding comprises:
grasping at least a portion of the handle extending outwardly of the housing; and
pulling on the handle so as to slide the flat planar body of the air filter outwardly of the housing.

14. The method of claim 9, further comprising:
applying an electrostatic charge to the flat planar body.

15. The method of claim 9, further comprising:
forming the flat planar body of a polypropylene material having a thickness of approximately one-sixteenth inch.

* * * * *